United States Patent

[11] 3,632,898

[72] Inventors Albert E. Slade
Saratoga;
John J. Newman, Santa Clara, both of Calif.

[21] Appl. No. 833,510
[22] Filed June 16, 1969
[45] Patented Jan. 4, 1972

[73] Assignee Memorex Corporation
Santa Clara, Calif.

[54] THERMOMAGNETIC COPYING OF MAGNETIC RECORDS WITH COOLING OF COPY MEDIUM CARRIER
5 Claims, 4 Drawing Figs.

[52] U.S. Cl. .................................................. 179/100.2 E, 346/74 MT
[51] Int. Cl. .................................................. G11b 5/02, G11b 5/86
[50] Field of Search .................................................. 179/100.2 E, 100.2 CR; 346/74 MT; 340/174.1 X

[56] References Cited

UNITED STATES PATENTS 2,915,594 12/1959 Burns et al. .................... 179/100.2 CR
3,364,496 1/1968 Greiner et al. .................... 179/100.2 CR
3,465,105 9/1969 Kumada et al. .................... 179/100.2 E

*Primary Examiner*—Bernard Konick
*Assistant Examiner*—Alfred H. Eddleman
*Attorney*—Limbach & Limbach

ABSTRACT: This application discloses a method and apparatus for copying magnetic signals from an original tape to a copy tape which are made from magnetic materials of high and low Curie point, respectively. The two tapes are unwound and moved through a transfer zone and then rewound separately. In the transfer zone, the plastic carrier of the copy tape is cooled while the magnetic coating of the copy tape is heated to its Curie point by radiation passing to the copy tape through the original tape.

INVENTORS
ALBERT E. SLADE
JOHN J. NEWMAN
BY
Limbach & Limbach
ATTORNEYS

THERMOMAGNETIC COPYING OF MAGNETIC RECORDS WITH COOLING OF COPY MEDIUM CARRIER

Thermomagnetic transfer of magnetic records has been known for some time as taught for instance in U.S. Pat. Nos. 2,793,135 and 3,364,496. As disclosed in these patents, magnetic signals recorded on an original magnetic record are copied onto a copy record by cooling the copy through the Curie point of its magnetic material under the influence of the field from the original record. The two records are held as close together as possible to obtain most efficient use of the magnetic field of the original, and as a result the original record is made from a magnetic material having a higher Curie point than the Curie point of the magnetic material in the copy.

The Curie point of the magnetic material is the minimum temperature at which the material looses its ferromagnetic properties, and the terms "high Curie point" and "low Curie point" are used for the magnetic materials of the original and copy respectively to indicate that there is an intermediate temperature between the two Curie points to which both may be heated where the ferromagnetic properties of the copy are lost while the ferromagnetic properties of the original remain.

Thermomagnetic transfer is particularly attractive as a method for producing copies of video tapes. Such copies have been made by interwinding on original tape and a copy tape on the same reel, heating the reel to a temperature about the Curie point of the copy, cooling to below the Curie point and then unwinding and separating the tapes.

The production of copies in this way has certain disadvantages particularly because each original record is useful for making only one copy during the entire period of time during interwinding, heating, cooling and unwinding. Additional problems are encountered in transferring heat through the two tapes interwound in a single reel and avoiding thermal damage to the tapes.

In the last regard, most magnetic recording tapes are made with a coating of magnetic material in a plastic binder (thermoplastic or thermosetting) coated on a thermoplastic carrier. When the binders of many tapes are heated to elevated temperatures for substantial times, they undergo physical or chemical change producing such detrimental effects as increased layer to layer adhesion. The carrier substrate is also effected adversely by heating, where, for instance, prestretched substrates such as Mylar may shrink upon heating to produce cupping of the magnetic tape.

It has been found in accordance with this invention that these disadvantages of known systems can be avoided by passing the original and copy tapes continuously through a transfer zone where the two tapes are held together and heated while the substrate side of the copy tape is continuously cooled. The two tapes are unwound from separate supply reels at one side of the transfer zone and wound onto takeup reels at the other side of the zone. The original tape can be passed through several transfer zones in sequence before rewinding so that several copies can be made simultaneously from a single original.

Heating of the two tapes is preferably accomplished by irradiating the tape pair from the original tape side while cooling the copy tape side with the cooling accomplished by contacting the copy tape carrier with a refrigerated body of high thermal conductivity. When thermomagnetic transfer is accomplished in this way, a high thermal gradient is maintained through the copy tape with the result that thermal damage to the copy tape with the result that thermal damage to the copy tape carrier is avoided and thermal damage to the copy tape binder is minimized by reducing the time period during which the binder is maintained at an elevated temperature. Additionally, the magnetic properties of the transfer may be influenced because the magnetic material in the copy tape is maintained at a lower temperature near the copy tape carrier than it is near the surface of the original tape.

Other features and advantages of the invention will be apparent from the following description of two specific forms of apparatus for using the invention which are shown in the attached drawing wherein.

Figures 1, 2, 3, 4:
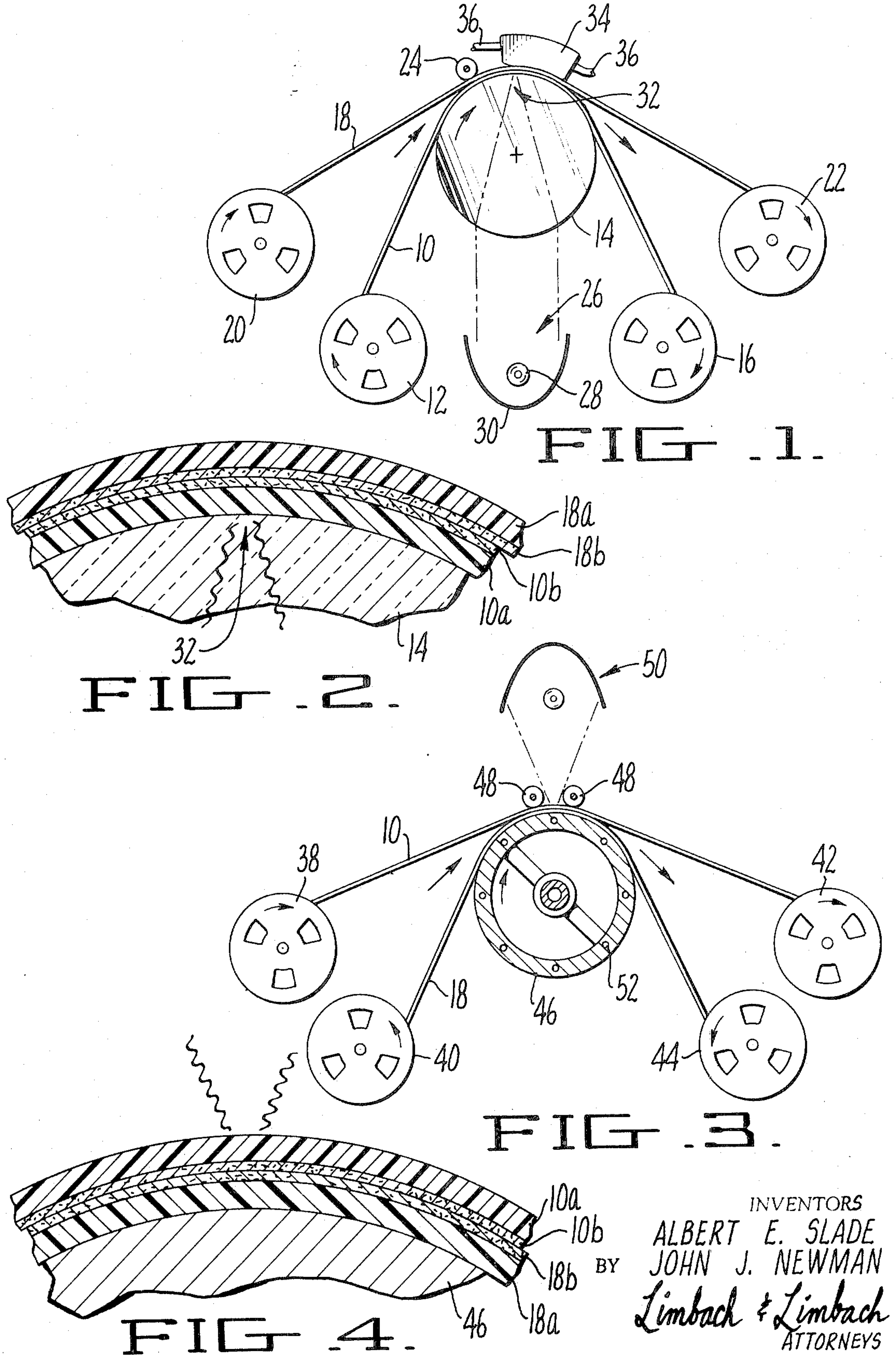
FIG. 1 is a schematic end elevation of apparatus for thermomagnetic copying in accordance with this invention.
FIG. 2 is a sectional view on a larger scale of the apparatus of FIG. 1.
FIG. 3 is a schematic end elevational view similar to FIG. 1, but showing an alternative form of apparatus.
FIG. 4 is an enlarged sectional view through the apparatus of FIG. 3.

Referring now in detail to the drawings and particularly to FIG. 1, an original tape 10 is unwound from a supply reel 12 and passes over a cylindrical element 14 to be wound up on a takeup reel 16. Conventional tape drive devices may be employed for driving the reels 12 and 16. As illustrated in FIG. 2, the original tape 10 includes a carrier web 10*a* and a magnetic coating 10*b* thereon where the coating 10*b* includes magnetic particles such as gammaferric oxide having a relatively high Curie point dispersed in a plastic binder which is adhered to the carrier 10*a*. It will be noted that the original tape 10 is wound onto the reel 12 and 16 with the magnetic coating facing outwardly, but as will be apparent from the subsequent description of FIG. 3, the reverse may also be the case.

A copy tape 18 is unwound from a supply reel 20 and is passed over the original tape 10 on the cylindrical element 14 to a takeup reel 22. Conventional tape drive devices may also be employed for the tape 18, but for simplicity of illustration these additional tape drive devices are not shown.

The cylindrical member 14 is driven in the direction indicated in FIG. 1 to eliminate tape slippage between cylindrical member 14 and the original tape 10, and a pinch roller 24 is preferably applied to the opposite side of the copy tape 18 to bring the tapes into intimate contact and eliminate as much as possible any entrapped air between them while also reducing any tendency for the two tapes 10 and 18 to creep with respect to each other in the area where they contact each other on the cylindrical member 14. As will be apparent from FIG. 2, the copy tape 18 includes a substrate 18*a* which may be conventionally from poststretched polyester film such as Mylar with the carrier supporting a magnetic recording layer 18*b* which includes a magnetic material of relatively low Curie point such as chromium dioxide dispersed in a plastic binder. Conveniently, the magnetic materials employed in the tapes 10 and 18 may be gammaferric oxide with a Curie point in excess of 500° C. and chromium dioxide with a Curie point of about 126° C.

Mounted below the cylindrical member 14 is a radiation source 26 for heating the tapes 10 and 18. The radiation source may take any suitable form such as an infrared radiating member 28 and a parabolic reflector 30. The cylindrical member 14 is made in the form of a lenticular lens which is transparent to the radiation from source 28 so that the radiation converges toward a relatively small area 32 on the cylinder 14 where the tapes 10 and 18 are superimposed upon each other. The optical parameters of the radiation source 26 and the lens 14 may be adjusted as desired to focus the radiation from the light source on a larger or smaller area of the periphery of the cylindrical element 14 where the two tapes 18 and 10 are in contact with each other in a thermomagnetic transfer zone.

A cooling member 34 is mounted on the opposite sides of the tape 10 and 18 from the cylindrical element 14 in the thermomagnetic transfer zone with the cooling member 34 in direct physical contact with the carrier substrate 18*a* of the copy tape 18. The cooling member 34 takes the form of a shoe made of a material such as aluminum of high thermal conductivity supplied with conduits 36 moving a refrigerant material such as Freon through the shoe 34.

The intensity of radiation source 26 and the heat removal capacity of cooling means may be varied over fairly wide limits, but the radiation source 26 is preferably controlled fairly carefully to heat the magnetic layer 18_b_ of the copy tape as little as possible above the Curie point of the magnetic material therein. In this regard, where the magnetic material in copy tape layer 18_b_ is chromium dioxide having a Curie point of 126° C., the apparatus is preferably operated to heat the layer 18_b_ in the transfer zone to a temperature between 126° C. and 146° C. while the temperature of the cooling body 34 is maintained below 20° C.

With reference to FIGS. 3 and 4, the same original and copy tapes 10 and 18 may be moved from supply reels 38 and 40, respectively, to takeup reels 42 and 44, respectively, over a cylindrical element 46 to which the tapes are held by pinch rollers 48. A radiation source 50 directs radiation against the carrier 10_a_ of the original tape as illustrated in the drawings while the carrier 18_a_ of the copy tape is cooled by the cylindrical element 46. In this regard, the cylindrical element 46 is made of a material of high thermal conductivity and provided with passageways 52 by which its surface is refrigerated.

While certain features and advantages of the invention have been illustrated and described in detail herein, it is obvious that many modifications may be made in components and configurations of the apparatus employed.

We claim:

1. The method of producing a copy of magnetic records from an original magnetic recording medium of high Curie point magnetic material to a copy medium which has a coating of low Curie point magnetic material on a carrier said method comprising:

A. continuously moving said original medium and said copy medium through a transfer zone while maintaining said media in contact with each other in said zone;

B. continuously heating said coating of said copy medium in said transfer zone to at least about the Curie point of said low Curie point material, and;

C. simultaneously cooling said carrier of said copy medium in said zone to a temperature below the Curie point of said low Curie point material and over an area which includes and is larger than the area over which said coating is heated by contacting said carrier with a high thermal conductivity metal, thereby maintaining a thermal gradient through the copy medium while said copy medium is heated.

2. The method of claim 1 in which said step of heating said coating is performed by irradiating said coating through said original medium.

3. The method of claim 2 in which said step of cooling said carrier is performed by contacting said carrier in said zone with a body of high thermal conductivity and simultaneously cooling said body.

4. The method of claim 3 in which said low Curie point magnetic material is chromium dioxide, said step of heating said coating is performed by heating said coating to a temperature between about 0° and 20° C. above the Curie point of said chromium dioxide, and said step of cooling said carrier is performed by maintaining said body at a temperature less than 20° C.

5. The method of claim 1 in which said step of moving said original and copy media through said transfer zone is performed by supporting said original and copy media on separate supply reels, unwinding said media from said supply reels, passing said media in unwound condition through said transfer zone in contact with each other and winding up said media on separate takeup reels.

* * * * *